United States Patent
Brooks, Jr. et al.

[19]

[11] Patent Number: 5,892,637
[45] Date of Patent: Apr. 6, 1999

[54] MULTI-PIECE INTEGRATED SUSPENSION ASSEMBLY FOR A MAGNETIC STORAGE SYSTEM

[75] Inventors: William Woodrow Brooks, Jr., Rochester, Minn.; Wesley LeRoy Hillman, Morgan Hill, Calif.; Darrell Dean Palmer; Randall George Simmons, both of San Jose, Calif.; Steven Harry Voss, Rochester, Minn.; Wing Chun Shum, San Jose, Calif.

[73] Assignee: International Business Machines Corporation, Armonk, N.Y.

[21] Appl. No.: 644,878

[22] Filed: May 10, 1996

[51] Int. Cl.⁶ .............................. G11B 5/60; G11B 21/21
[52] U.S. Cl. .......................................................... 360/104
[58] Field of Search .......................... 360/97.01, 98.01, 360/103, 104, 105, 108, 106

[56] References Cited

U.S. PATENT DOCUMENTS

| | | | |
|---|---|---|---|
| 4,819,094 | 4/1989 | Oberg | 360/137 |
| 4,823,217 | 4/1989 | Kato et al. | 360/104 |
| 5,027,241 | 6/1991 | Hatch et al. | 360/104 |
| 5,333,085 | 7/1994 | Prentice et al. | 360/104 |
| 5,367,419 | 11/1994 | Kazama | 360/104 |
| 5,384,432 | 1/1995 | Noro et al. | 360/104 |
| 5,391,842 | 2/1995 | Bennin et al. | 360/104 |
| 5,414,576 | 5/1995 | Ueki et al. | 360/108 |
| 5,422,764 | 6/1995 | McIlvanie | 360/97.01 |
| 5,528,819 | 6/1996 | Mckay et al. | 360/104 |
| 5,570,249 | 10/1996 | Aoyagi et al. | 360/104 |
| 5,570,261 | 10/1996 | Frater et al. | 360/104 |
| 5,594,607 | 1/1997 | Erpelding et al. | 360/104 |
| 5,608,591 | 3/1997 | Klaassen | 360/104 |

FOREIGN PATENT DOCUMENTS

| | | | |
|---|---|---|---|
| 60-246015 | 12/1985 | Japan | 360/103 |
| 4-40680 | 2/1992 | Japan | 360/103 |
| 5-182141 | 7/1993 | Japan | 360/103 |
| 6-68445 | 3/1994 | Japan | 360/103 |

*Primary Examiner*—Jefferson Evans
*Assistant Examiner*—David L. Ometz
*Attorney, Agent, or Firm*—Noreen A. Krall

[57] ABSTRACT

An integrated suspension for a slider in a magnetic storage system has a simplified structure that is relatively easy to manufacture. The novel integrated suspension may be assembled from separate pieces, including a load beam, a flexure and a mounting plate. The load beam provides rigid structural support of the flexure. The flexure includes a flexible member and leads integrally formed thereon. A section of the flexible member is fixedly attached to the load member, and another section having the slider mounted thereon presses against a pivot projection in the load beam for gimbal motions. An interlocking structure is provided to limit the extent of gimbal motions of the flexible member, comprising a tab extending from the flexible member into an aperture in the load beam. Alternatively, a tang is formed in the flexible member which is used to form a clip which serves to limit gimbal motions as it interacts with the load beam.

21 Claims, 11 Drawing Sheets

MULTI-PIECE INTEGRATED SUSPENSION ASSEMBLY FOR A MAGNETIC STORAGE SYSTEM

BACKGROUND OF THE INVENTION

1. Field of the Invention

The present invention relates to a slider-suspension assembly for a magnetic storage system, and more particularly to a multi-piece integrated suspension assembly for use in a magnetic disk storage system.

2. Description of the Related Art

Magnetic disk drives are information storage devices which utilize at least one rotatable disk with concentric data tracks containing the information, a head (or "transducer") for reading data from or writing data to the various tracks, and a head positioning actuator connected to the head for moving it to the desired track and maintaining it over the track centerline during read or write operations. The transducer is attached to an air-bearing slider which is supported adjacent the data surface of the disk by a cushion of air generated by the rotating disk. The slider is mounted on a support arm of the head positioning actuator by means of a suspension.

The suspension provides dimensional stability between the slider and actuator arm, and controlled flexibility in slight vertical as well as pitch and roll motions (gimbaled motions) of the slider during its relative motion above the rotating magnetic disk surface. The suspension generally comprises a load beam, which is mounted to an actuator arm of the head positioning actuator, and a flexure element supported by the load beam which supports the slider. The load beam provides a resilient spring action which biases the slider toward the surface of the disk, while the flexure provides flexibility for the slider as the slider rides a cushion of air in close proximity against the rotating disk. In the past, various suspension structures have been proposed. For those suspensions having flexures with integrated conductor leads for making electrical connections to the sliders mounted thereon, they are sometimes referred to as trace suspension assemblies or integrated suspension assemblies.

With the push for higher recording densities, it becomes a challenge to format the disk surface with narrower data tracks and narrower inter-track spacings in order to pack more data tracks on the disk surface. To meet this challenge, the performance specification requirements for the flexure is more stringent, in addition to the requirements of the other structural and mechanical components of the disk drive system which are relatively easier to achieve and control. For example, it is important that the integrated suspension be constructed of a light weight structure that is dimensionally stable. The flexure of the integrated suspension must be durable in maintaining its flexibility and reliable in accurately and repeatedly positioning the slider with respect to the disk surface such that the densely packed data tracks can be accessed with tight tolerance in slider/track alignment. Further, it is desired to develop smaller integrated suspensions so as to meet the requirement of disk drive systems of smaller physical size. Due to the relatively small physical size and fragile structure of the suspension assembly, it becomes a challenge to develop integrated suspension structures that are designed for manufacturability while achieving the desired performance specifications and yield requirement.

Assignee's U.S. Pat. No. 4,996,623 disclosed a laminated suspension having a flat flexible sheet of material bonded on both sides to patterned metal layers. This suspension includes an arm portion for attachment to the actuator support arm, a slider portion to which the slider is attached, and a link portion interconnecting the arm and slider portions such that the slider portion extends beyond the actuator support arm at its end. The structure of this design is relatively complex.

Figure 1:
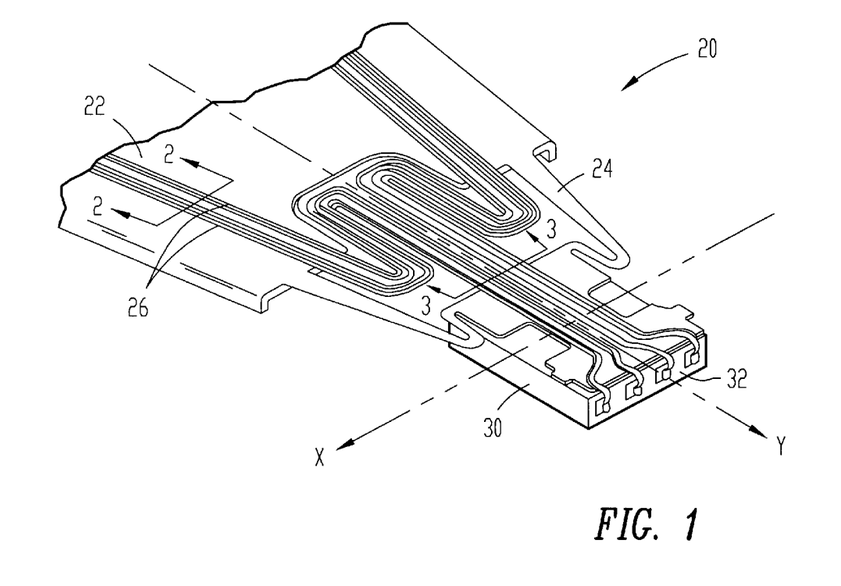
FIG. 1 is a perspective view of the slider region of a prior art integrated suspension assembly.
Figure 2:
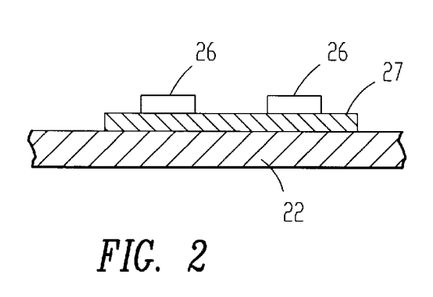
FIG. 2 is a sectional view taken along line 2—2 in FIG. 1.
Figure 3:
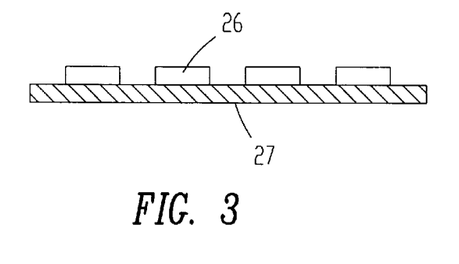
FIG. 3 is a sectional view taken along line 3—3 in FIG. 1.

FIG. 1 depicts an integrated suspension 20 which was disclosed in U.S. patent application Ser. No. 08/365,123. This integrated suspension 20 includes a load beam 22, a flexure 24 of reduced thickness integrally extending from the load beam 22, conductive leads 26, and a slider 30 mounted to the surface of the flexure 24. An intermediate layer of dielectric material 27 separates the leads 26 from the load beam 22 and the flexure material (see FIG. 2), and supports the leads 26 in a suspended manner along some of its sections (see FIG. 3). The leads 26 terminate on the slider 30 in electrical connection to the read and write sensors contained therein. It is noted that the terminations of the leads 26 are routed over the end of the flexure 24 to terminate on the end face 32 of the slider, which makes the leads 26 more prone to damage during manufacturing and subsequent handling of the integrated suspension 20. Also, it has been found that in a disk drive system which implements a stack of integrated suspensions 20 for multiple disks, more vertical height is needed in the actuator stack to accommodate interconnection of the leads and a flex cable from the control electronics of the disk drive system.

SUMMARY OF THE INVENTION

The present invention presents a simplified integrated suspension structure that is relatively easy to manufacture. The novel integrated suspension may be assembled from separate pieces, including a load beam, a flexure and a mounting plate. The load beam provides rigid structural support of the flexure. The flexure includes a flexible member and leads integrally formed thereon. A section of the flexible member is fixedly attached to the load member, and another section having the slider mounted thereon presses against a pivot projection in the load beam for gimbal motions. An interlocking structure is provided to limit the extent of gimbal motions of the flexible member, comprising a tab extending from the flexible member into an aperture in the load beam. Alternatively, a tang is formed in the flexible member which is used to form a clip which serves to limit gimbal motions as it interacts with the load beam.

DESCRIPTION OF THE PREFERRED EMBODIMENTS

The present description is for illustrative purpose and should not be taken in a limiting sense. The scope of the present invention can best be determined from the appended claims. For example, although the present invention is described in reference to a magnetic disk storage system and in particular one which implements a slider containing a magnetoresistive ("MR") sensor, it will be apparent that the invention may be implemented in other magnetic storage systems including recording systems such as a magnetic tape recording system or other applications which could take advantage of an integrated head suspension assembly.

Figure 4:
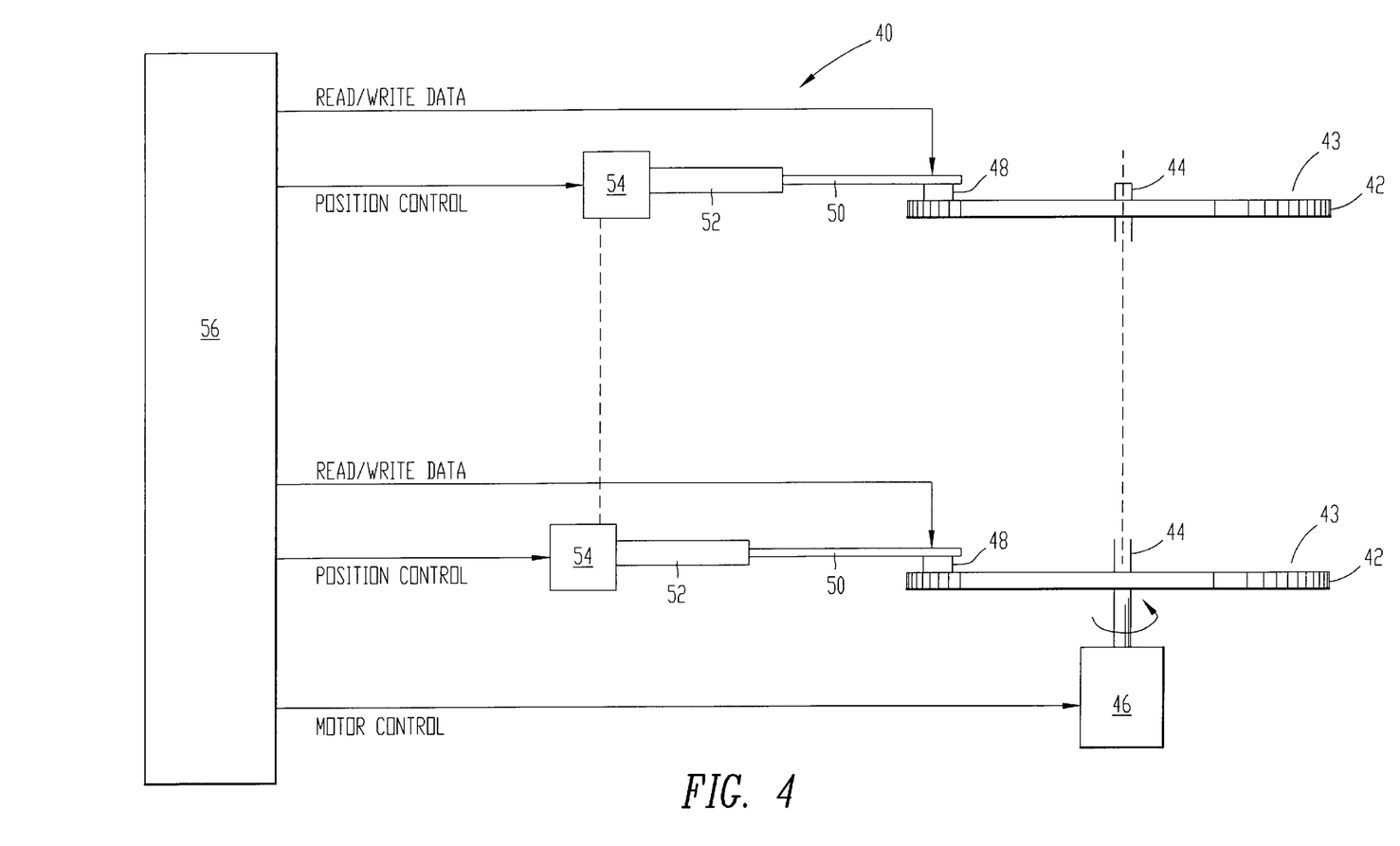
FIG. 4 is a schematic/block diagram of a magnetic disk storage system in which the integrated suspension of the present invention is implemented.

FIG. 4 illustrates a simplified schematic block diagram of a magnetic disk storage system 40 embodying the present invention. The magnetic disk storage system 40 comprises at least one rotatable magnetic disk 42 which is supported on a spindle 44 and rotated by a disk drive motor 46, and at least one slider 48 positioned in close proximity to the magnetic recording media at the disk surface 43. Data is stored in the magnetic recording media on each disk 42 in the form of an annular pattern of concentric data tracks (not shown). Each slider 48 contains one or more magnetic MR sensors and write transducers (not shown). The slider 48 is mounted to an integrated suspension 50 which is connected to an actuator means 54 by way of an actuator arm 52. As the disk 42 rotates, the slider 48 is controlled to move across the disk surface 43 by the actuator means 54 so that the slider 48 may access different portions of the disk surface 43 where desired data is recorded or read. The integrated suspension 50 provides a slight spring force which biases the slider 48 against the disk surface 43 and controls flexibility in slight vertical as well as roll and pitch movements of the slider 48 relative to the rotating disk surface 43. The actuator means as shown in FIG. 4 may be a voice coil motor (VCM), for example. The various components of the magnetic disk storage system 40 are controlled in operation by control signals generated by control unit 56, such as control of the actuator means 54, drive motor 46 and reading/writing data.

Figure 5:
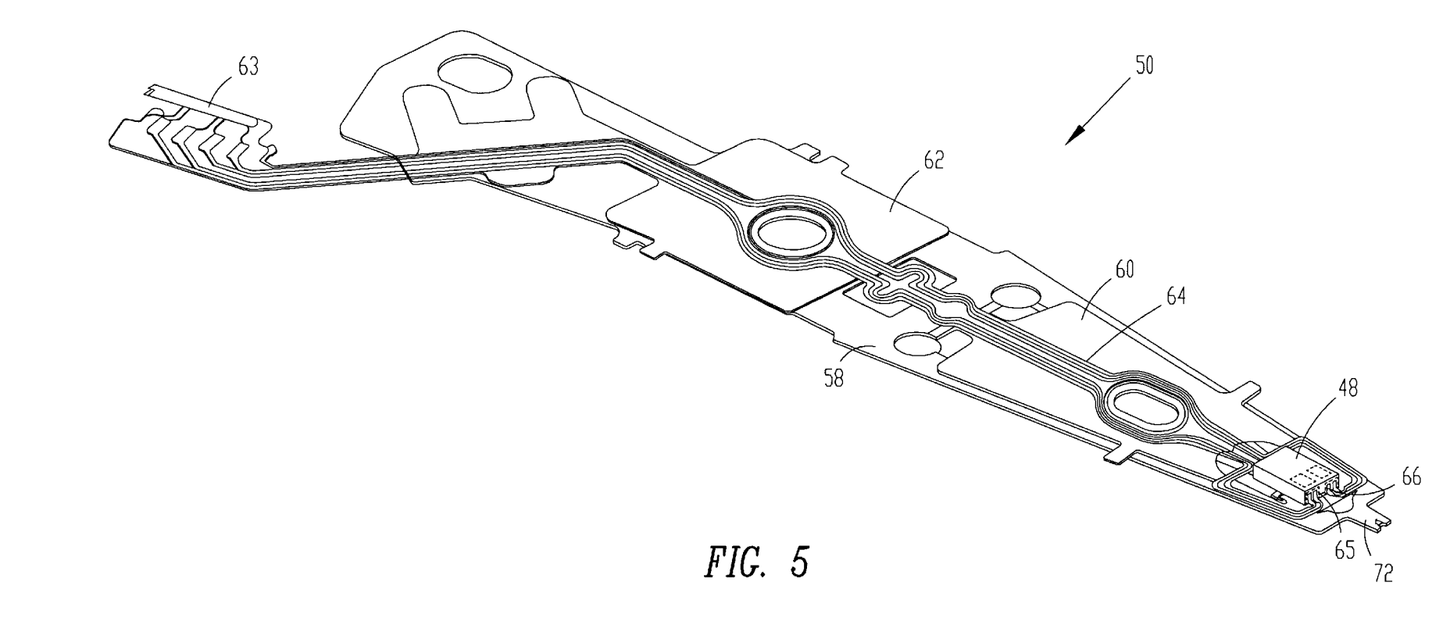
FIG. 5 is a perspective view of an integrated suspension assembly in accordance with one embodiment of the present invention.
Figure 6:
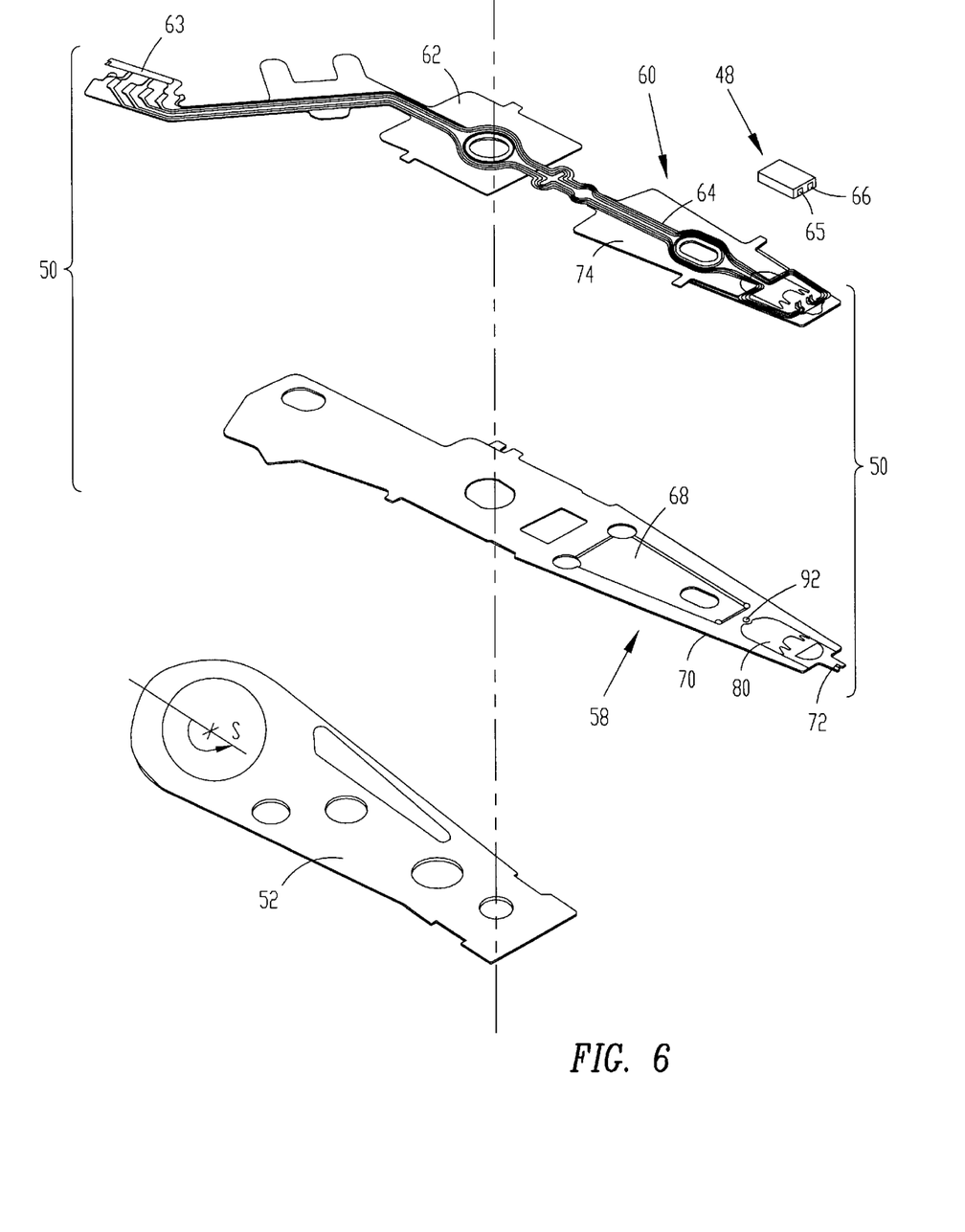
FIG. 6 is an exploded perspective view of the integrated suspension assembly shown in FIG. 5.

FIG. 5 is a perspective view of a multi-piece integrated suspension 50 in accordance with one embodiment of the present invention. FIG. 6 is an exploded perspective view of the major components making up the integrated suspension 50, and the actuator arm 52 to which the integrated suspension 50 is attached. The actuator arm 52 pivotally supports the integrated suspension 50 about the axis S of the spindle (not shown) of the actuator means 54 in the disk drive system 40. The primary pieces of this integrated suspension 50 include a load beam 58, a flexure 60 and a mount plate 62. One end of the load beam 58 is fixedly attached to the actuator arm 52 using the mount plate 62, and the other end supports on its surface the flexure 60. The flexure 60 has integrated conductor leads 64 or traces on its surface. The slider 48 is bonded to the tip end of the flexure 60. The slider 48 may be of the type which contains an integrated MR read sensor 65 and inductive write transducer 66. (The read sensor and write transducer are schematically depicted by dotted lines in the figures for illustrative purpose only. The actual sizes and locations of these components differ from what are shown, which do not affect the understanding of the present invention herein.) The mount plate 62 supports the ends of the leads 64. The leads terminate at one end at the slider 66 and at the other end in a multiconnector 63 on the mount plate 62 for electrically connecting to the electronics of the control unit 56 (shown in FIG. 4) via a flex cable (not shown).

Figure 7:
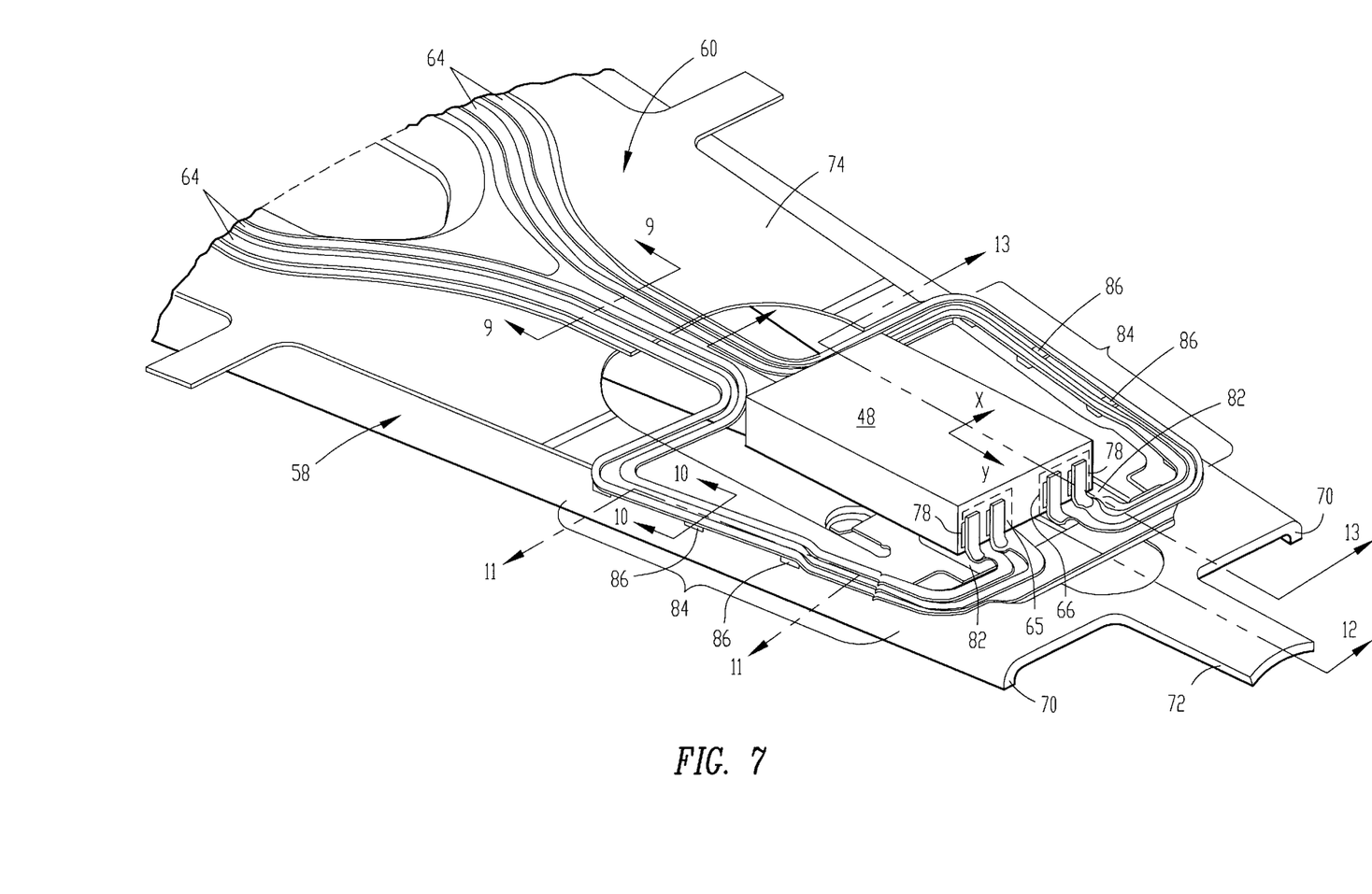
FIG. 7 is a perspective view of the slider region of the integrated suspension assembly shown in FIG. 5.

FIG. 7 more clearly illustrates the slider region on the flexure 60. The leads 64 terminate on the contact pads 78 on the end face of the slider 48; one pair of the leads 64 being in electrical connection with the MR read sensor 65, and the other pair of leads 64 being in electrical connection with the write transducer 66. The lead terminations may be bonded to the slider pads 78 by conventional ultrasonic bonding processes or soldering. It is noted that the leads 64 are bent at their ends so that they can be positioned with a flat surface against the pads for bonding thereto. The leads 64 may be bent before or after the flexure 60 has been attached to the load beam 58. If the latter, the aperture 80 in the load beam 58 and apertures 82 in the flexure 60 provide access for forming the bent lead terminations. Also, these apertures 80 and 82 provide access to the slider so that it can be rigidly held during bonding (e.g., by ultrasonic bonding operation) of the leads to the slider pads. More detail descriptions of the structure of the various components and assembly thereof follow below.

Figure 8A:
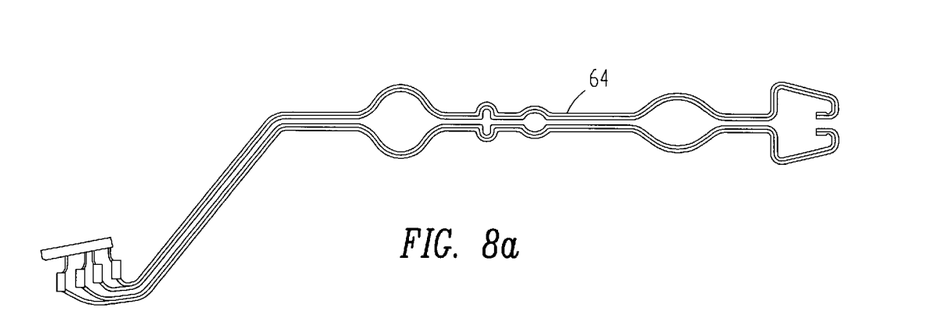
FIGS. 8(a)–(d) are top views of the load arm and the sequence of the different layers of the flexure of the integrated suspension assembly shown in FIG. 5.
Figure 8B:
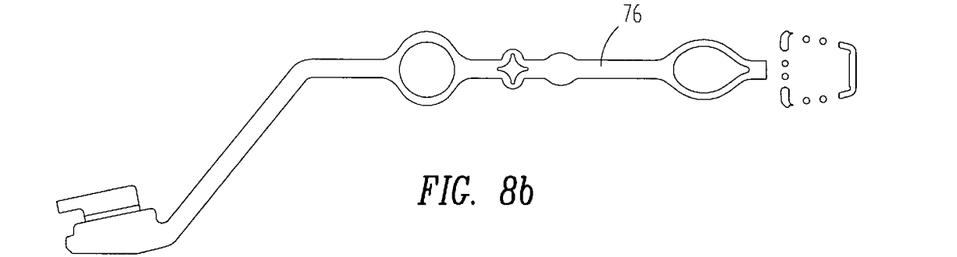
Figure 8C:
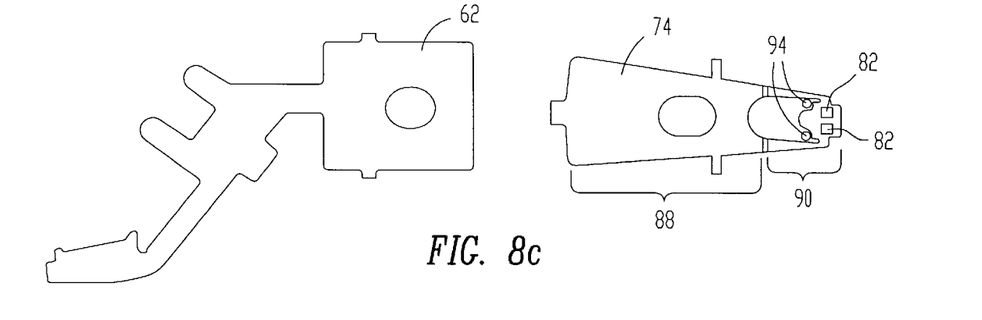
Figure 8D:
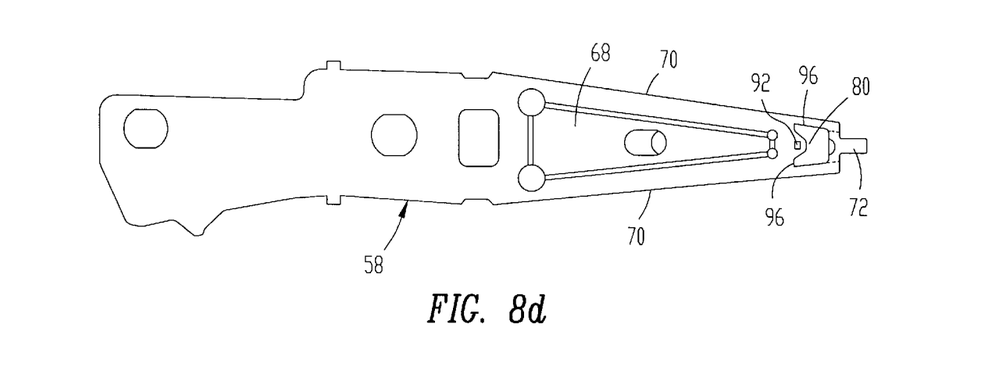

Referring to FIG. 8(d), the load beam 58 is generally flat and rigid, made of stainless steel or a ceramic material, for example. In the illustrated embodiment, the load beam is stainless steel of about 0.04 to 0.05 mm thick. For faster slider positioning response in the disk drive system 40, it is desirable to maintain the weight and inertia of the load beam 58 as small as possible using thinner material without compromising its structural rigidity. To improve torsional rigidity of the thin load beam 58, it is stamped with surface features on its flat structure, such as the triangular depression or well 68. As will be apparent from below, this well 68 together with the flexure 60 attached thereon, form a box structure which is more rigid than an otherwise entirely flat load beam 58 (see FIG. 9). Further, the edges along the length of the load beam are curled to form flanges 70. These flanges 70 also facilitate handling of the integrated suspension 50 to avoid handling damage during the manufacturing process. In addition, a tongue 72 extends from the end of the load beam 58 which also facilitates handling of the integrated suspension 50 during its assembly in the disk drive system 40. The tongue 72 can also be used to load and unload the slider 48 on the disk 42.

Figure 9:
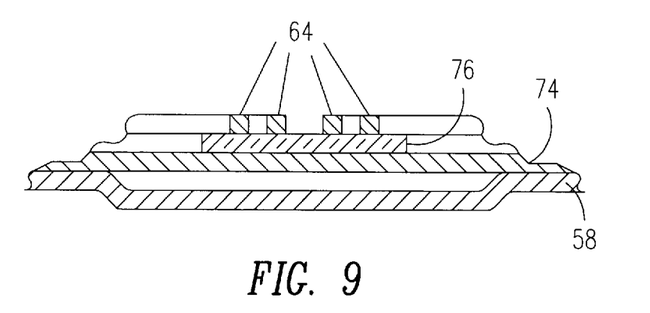
FIG. 9 is a sectional view taken along line 9—9 in FIG. 7.

The flexure 60 includes several layers of different materials in an integral structure (see FIG. 9). Referring to FIGS.

Figure 10:
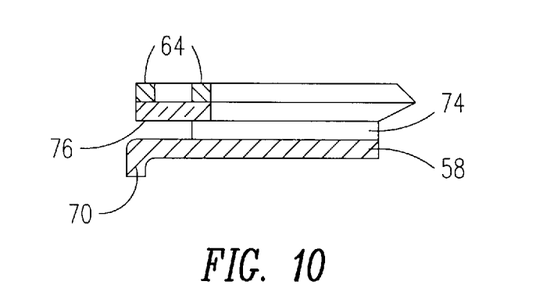
FIG. 10 is a sectional view taken along line 10—10 in FIG. 7.
Figure 11:
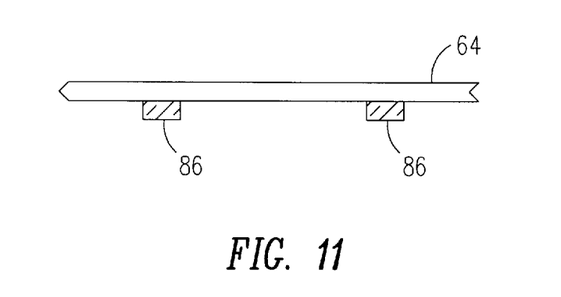
FIG. 11 is a sectional view taken along line 11—11 in FIG. 7.

8 (a)–(c), the various layers of the flexure 60 are indicated in a top down sequence in plan views. The structure layer of the flexure 60 is a sheet of flexible material (hereinafter referred to as the spring layer 74) which may be stainless steel, or other suitable spring material, and of a thickness (about 18 to 20 microns in the illustrated embodiment) that can provide the desired elastic deflections. It may be shaped by etching or stamping processes. The layer of dielectric material 76 (polyimide, for example) is an intermediate layer separating the spring layer 74 and the layer of leads 64 (made of copper, for example). The dielectric and lead layers may be formed by using conventional photolithographic processes well know in the art. The mount plate 62 may be of the same material as the spring layer 74 and formed in the same process as the spring layer 74. It is noted that the sections 84 of the leads 64 are positioned beyond the edges of the spring layer 74. These sections 84 of the leads are maintained in a fixed spaced apart relationship by the dielectric material at several points 86 along these sections 84 (see also FIGS. 10 and 11). This lead configuration is intended to eliminate their contact with the spring layer 74. As will be understood from the discussion below, the spring layer 74 needs to maintain flexibility for gimbal support of the slider about its roll and pitch axes.

Figure 12:
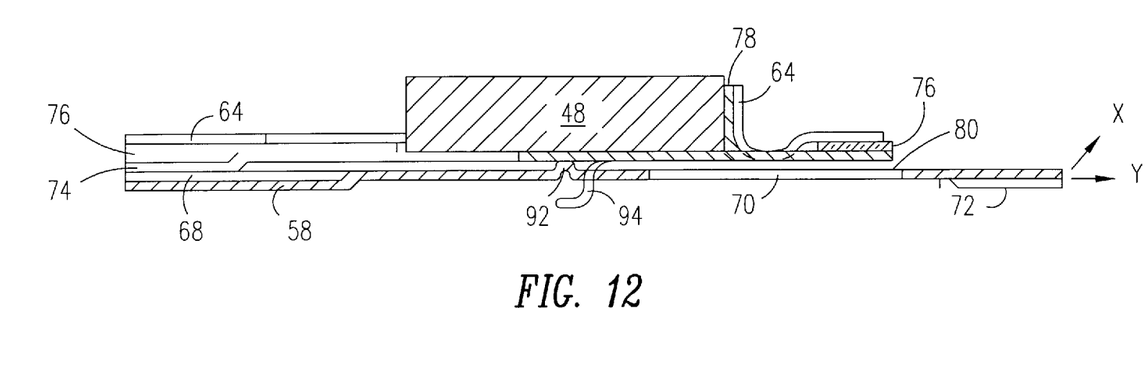
FIG. 12 is a sectional view taken along line 12—12 in FIG. 7.
Figure 13:
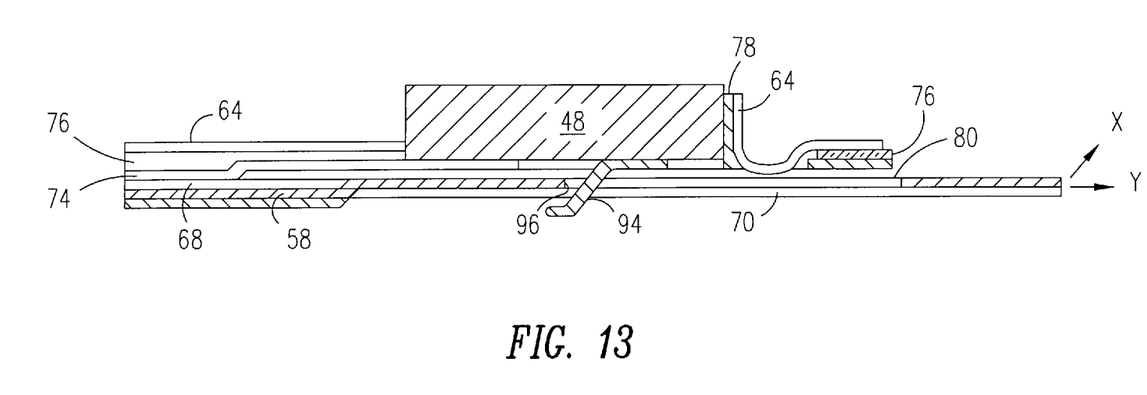
FIG. 13 is a sectional view taken along line 13—13 in FIG. 7.
Figure 14:
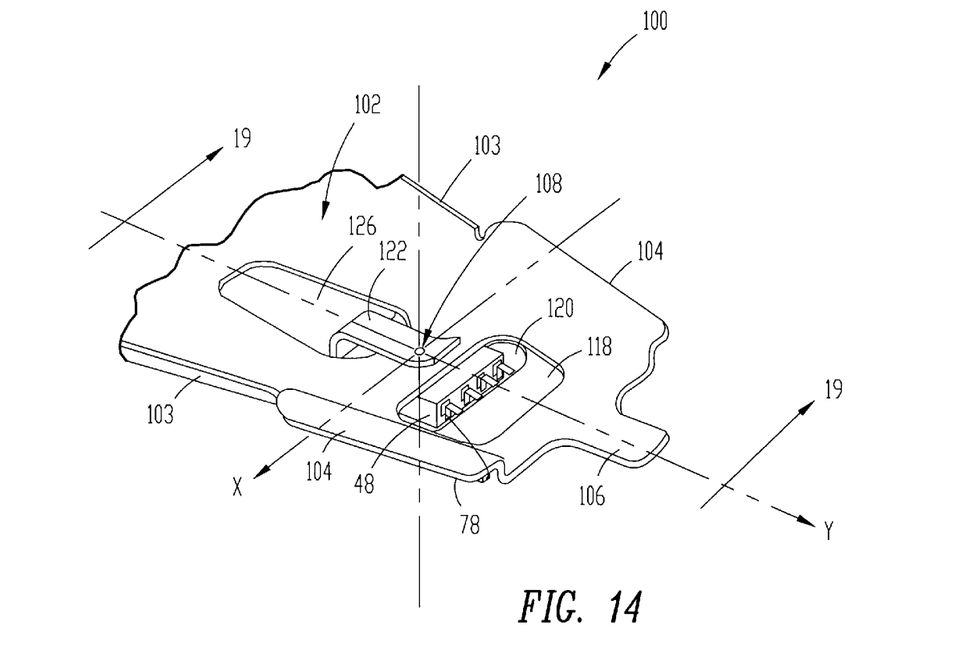
FIG. 14 is a bottom perspective view of the slider region of an integrated suspension assembly in accordance with another embodiment of the present invention.
Figure 15:
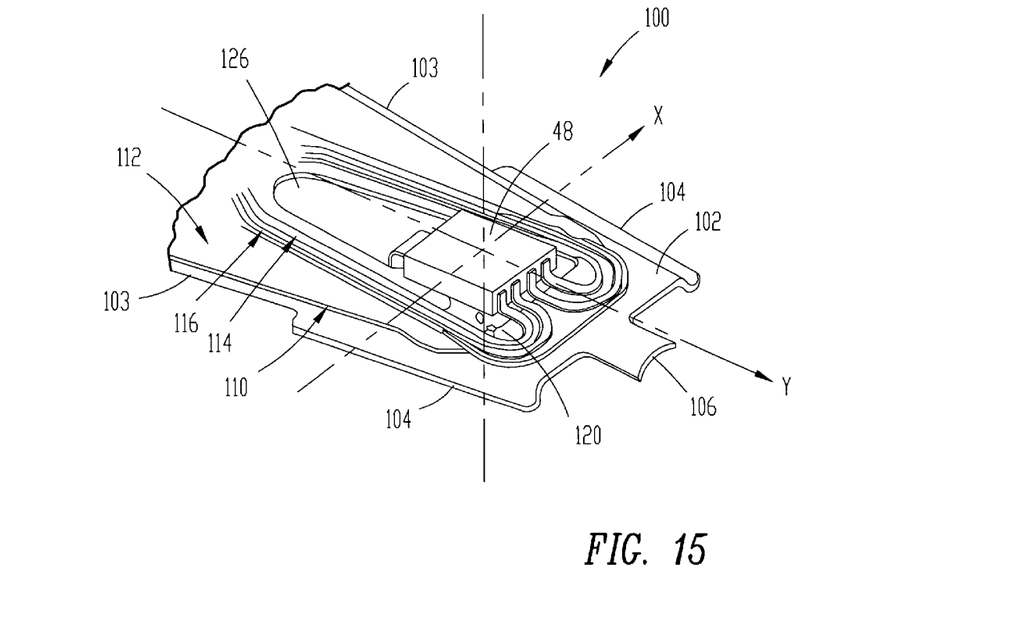
FIG. 15 is a top perspective view of the slider region shown in FIG. 14.
Figure 16A:
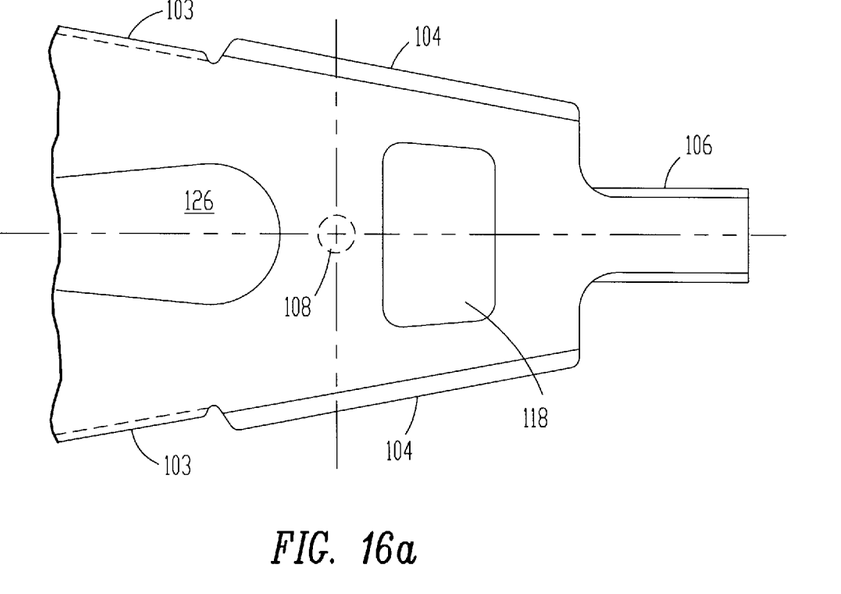
FIGS. 16(a) and (b) are top views of the load beam and flexure at the slider region shown in FIG. 15.
Figure 16B:
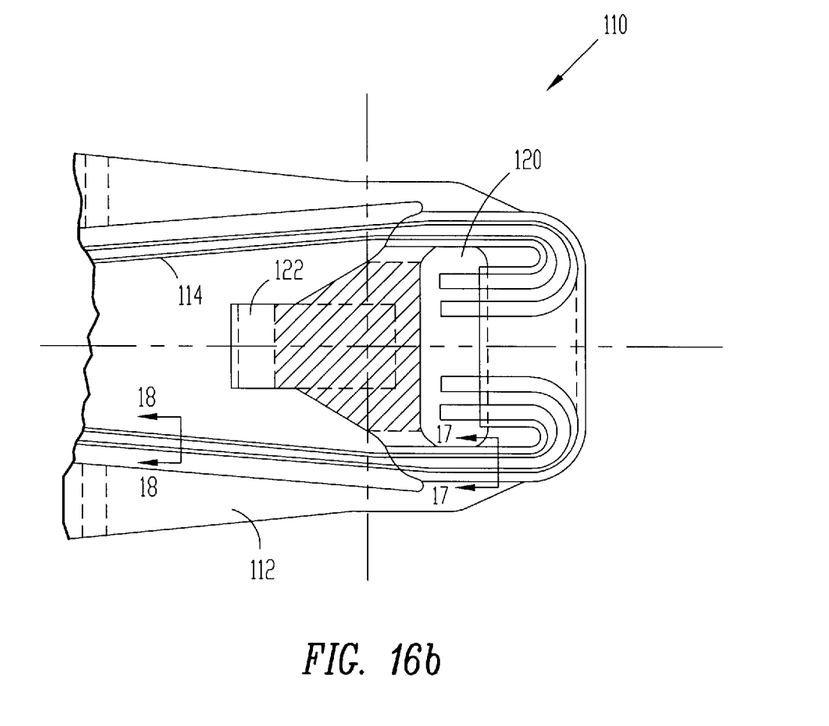
Figure 17:
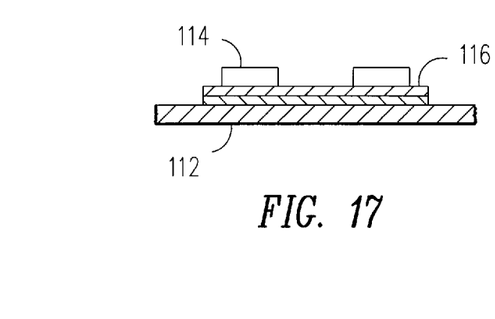
FIG. 17 is a sectional view taken along line 17—17 in FIG. 16(b).
Figure 18:
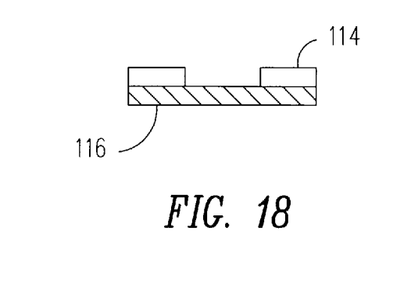
FIG. 18 is a sectional view taken along line 18—18 in FIG. 16(b)
Figure 19:
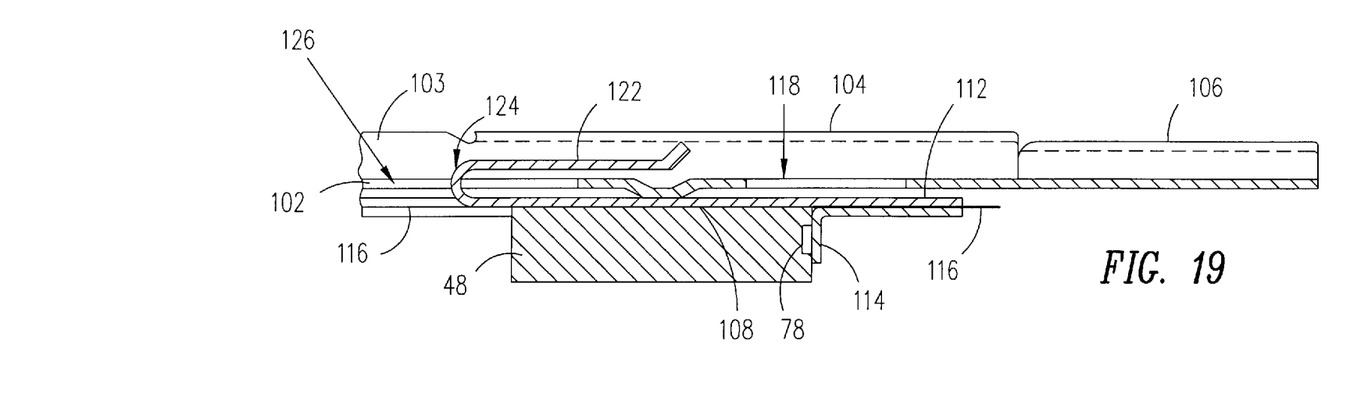
FIG. 19 is a sectional view taken along line 19—19 in FIG. 14.

The flexure 60 is structured and attached to the load beam 58 in a manner as to provide the desired gimbal motions. Specifically, the section 88 of the spring layer 74 is rigidly attached to the load beam 58 by means of welding, rivets or epoxy, for example. As mentioned before, the flexure spring layer 74 with the well 68 on the load beam 58 form a rigid box structure (FIG. 9). The section 90 of the flexure 60 with the slider 48 thereon is not fixedly attached to the load beam 58, but is biased by the spring layer 74 to rest against a gimbal pivot 92 on the load beam 58. The gimbal feature of the integrated suspension 50 is now explained more clearly in reference to FIGS. 12 and 13. The gimbal pivot 92 is located on the load beam 58 in the slider region against which the spring layer 74 of the flexure 60 rests. The spring layer 74 with the slider 48 attached thereon is free to elastically pivot about pitch (X) and roll (Y) axes at this gimbal pivot 92, since the spring layer 74 at the section 90 is not fixedly attached to the load beam 58. Due to the flat laminated structure of the flexure 60, motion along the X axis is restricted. To limit the extent of pitch and roll motions so as to prevent damage to the flexure 60, tabs 94 are provided in the spring layer 74 of the flexure 60 which extend through the aperture 80 on the load beam 58 (see FIG. 13). One or both of the tabs 94 would interlock against the edge 96 of the aperture 80 before pitch and/or roll motions exceed their designed range, thereby limiting such motions.

A second embodiment of an integrated suspension 100 in accordance with the present invention is illustrated in reference to FIGS. 14 to 19. For simplicity, only the slider end of the integrated suspension 100 is shown in the figures, as the other end of the suspension 100 may be similar to that of the previous embodiment. In this second embodiment, the load beam 102 also has flanges 103 along its longitudinal edges. In addition, at the end of the load beam 102 in the slider region, bumpers 104 are provided which further facilitates handling of the integrated suspension. As in the previous embodiment, a tongue 106 extends from the end of the load beam. A gimbal pivot 108 is provided on the load beam 102 for pivoting gimbal motions of the slider 48. The flexure 110 has a spring layer 112 and integral leads 114 formed thereon with an intermediate integral dielectric layer 116. Some sections of the leads 114 are suspended without support of the flexure spring layer 112 along these sections (see FIG. 18). The slider 48 is bonded to the flexure spring layer 112 by adhesive, for example. Like in the previous embodiment, the lead terminations are bent for bonding to the slider pads 78. Apertures 118 and 120 in the load beam 102 and flexure 110 facilitates such bonding. The flexure 110 is fixedly attached to the load beam 102 at the end not shown in the figures in a manner similar to the previous embodiment. The slider end of the flexure 112 is biased by the spring layer to rest against the gimbal pivot 108 on the load beam 102.

It is noted that in this embodiment, a tang 122 is etched in the spring layer 112 which is looped to form an U-shaped clip 124. This clip 124 serves to limit excessive roll and pitch motions about the gimbal pivot 108 (see FIG. 19). The clip 124 may be pre-formed on the flexure 110 prior to its attachment to the load beam 102. The flexure can then be clipped onto the load beam 102 through the aperture 126.

As one can appreciate from the foregoing description of the present invention in reference to the illustrated embodiments, the structure of the novel integrated suspension assembly is less complex compared to those in the prior art, while providing the desired gimbal characteristics. The novel structure is relatively easy to manufacture, with separate pieces of the suspension assembly (namely, the flexure and load beam) formed separately and finally assembled.

While the present invention has been particularly shown and described with reference to the illustrated embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

We claim:

1. A multi-piece suspension assembly for supporting a slider in a magnetic storage system, comprising:

a rigid load member which is generally flat, said load member including first and second sections each having first and second surfaces spanning across the first and second sections of the load member, a flexure including a flexible member, an aperture and conductive leads integrally formed thereon, said slider being mounted on the flexible member on a slider mounting section at one end thereof in electrical connection to the leads, wherein the flexible member is generally flat and includes first and second sections, each having first and second surfaces spanning across said first and second sections of the flexible member, said leads integrally formed on the first surface of the first and second sections of the flexible member, said slider being mounted on the first surface at one end of the first section of the flexible member, said second section of the flexible member being fixedly attached to the second section of the load member with the second surface of the flexible member facing towards the first surface of the load member; and pivoting means between the flexible member and the load member for pivoting gimbal motions of the flexible member, said pivoting means located between the first surface of the first section of the load member and the second surface of the first section of the flexible member, wherein the second section of the flexible member is fixedly attached to the load member with the first section of the flexible member free to pivot about the pivoting means for gimbal motions, further wherein the leads terminate at one end on the slider so as to extend over the aperture near the end of the flexure, the leads thus have an unsupported portion adjacent ends of the leads which are bent to have a flat side contacting the slider.

2. A multi-piece integrated suspension assembly as in claim 1 further wherein the leads are partially unsupported by the flexure on a side of the slider mounting section of the flexure member.

3. A multi-piece integrated suspension assembly as in claim 2 wherein the flexure further includes an integral intermediate layer of dielectric material between the leads and the flexible member.

4. A multi-piece integrated suspension assembly as in claim 2 wherein the leads are integrally formed on the flexible member by a photolithographic process.

5. A multi-piece integrated suspension assembly as in claim 2 wherein the leads include a section which extends beyond an edge of the first section of the flexible member.

6. A multi-piece integrated suspension assembly as in claim 2 wherein the leads terminate on the slider at a far end of the slider relative to the second section of the flexible member.

7. A multi-piece integrated suspension assembly as in claim 6 wherein the leads are configured around lateral sides of the slider and along the first and second sections of the flexible member.

8. A multi-piece integrated suspension assembly as in claim 2 wherein the aperture is provided in the first section of the flexible member in a position below the termination of the leads on the slider to facilitate bending of the leads integrally formed on the flexible member.

9. A multi-piece integrated suspension assembly as in claim 1 wherein the pivoting means is a projection on the first surface at the first section of the load member which pivotally supports the first section of the flexible member, said second surface of the first section of the flexible member pressing against the projection.

10. A multi-piece integrated suspension assembly as in claim 9 further comprising a mount plate attached on the first surface of the second section of the load member, wherein part of the leads are integrally formed on the mount plate.

11. A multi-piece integrated suspension assembly as in claim 9 wherein the load member has a tongue extending from a distal end of the first section of the load member.

12. A multi-piece integrated suspension assembly as in claim 9 wherein the load member has edges along the first and second sections bent to add structural rigidity to the load member.

13. A multi-piece integrated suspension assembly as in claim 1 wherein the flexure further includes limiting means for limiting the gimbal motions of the first section of the flexible member.

14. A multi-piece integrated suspension assembly as in claim 13 wherein the limiting means include an aperture provided on the load member and an integral tang extending from the first section of the flexible member and through said aperture on the load member which interacts with an edge of the aperture on the load member to limit gimbal motions of the first section of the flexible member.

15. A multi-piece integrated suspension assembly as in claim 14 wherein the integral tang forms a U-shaped clip which clips onto the load member through the aperture on the load member.

16. A magnetic storage system comprising:
    a magnetic storage medium having a plurality of tracks for receiving data;
    drive means for moving the storage medium;
    slider including a read sensor and a write transducer maintained in a closely spaced position relative to said magnetic storage medium during relative motion between said slider and said storage medium;
    actuator means coupled to said slider for moving said slider relative to the magnetic storage medium to selected tracks on said magnetic storage medium, said actuator means including an integrated suspension assembly which supports the slider; said integrated suspension assembly comprising:
    (a) a rigid load member which is generally flat, said load member including first and second sections each having first and second surfaces spanning across the first and second sections of the load member;
    (b) a flexure including a flexible member, an aperture and conductive leads integrally formed thereon, said slider being mounted on the flexible member in a slider mounting section at one end thereof in electrically connection to the leads, the flexible member is generally flat and includes first and second sections each having first and second surfaces spanning across said first and second sections of the flexible member, said leads integrally formed on the first surface of the first and second sections of the flexible member, said slider being mounted on the first surface at one end of the first section of the flexible member, said second section of the flexible member being fixedly attached to the second section of the load member with the second surface of the flexible member facing towards the first surface of the load member; and
    (c) pivoting means between the flexible member and the load member, said pivoting means between the first surface of the first section of the load member and the second surface of the first section of the flexible member, wherein the second section of the flexible member is fixedly attached to the load member with the first section of the flexible member free to pivot about the pivoting means for gimbal motions; and
    control means for controlling the operations of the drive means, the actuator means and the reading and writing of data with respect to the magnetic storage medium;
    wherein the second section of the flexible member is fixedly attached to the load member with the first section of the flexible member free to pivot about the pivoting means for gimbal motions, further wherein the leads terminate at one end on the slider so as to extend over the aperture near the end of the flexure, the lead thus have an unsupported portion adjacent ends of the leads which are bent to have a flat side contacting the slider.

17. A magnetic storage system as in claim 16 wherein the pivoting means is a projection on the first surface at the first section of the load member which pivotally supports the first section of the flexible member, said second surface of the first section of the flexible member pressing against the projection.

18. A magnetic storage system as claimed in claim 16 further wherein the leads are partially unsupported by the flexure on a side of the slider mounting section of the flexure member.

19. A magnetic storage system as in claim 16 wherein the flexure further includes limiting means for limiting the gimbal motions of the first section of the flexible member.

20. A magnetic storage system as in claim 19 wherein the limiting means include an aperture provided on the load member and an integral tang extending from the first section of the flexible member and through said aperture on the load member which interacts with an edge of the aperture on the load member to limit gimbal motions of the first section of the flexible member.

21. A magnetic storage as in claim 20 wherein the integral tang forms a U-shaped clip which clips onto the load member through the aperture on the load member.

* * * * *